July 6, 1926.

J. W. DONOVAN

LAWN MOWER

Filed August 14, 1925

Inventor
John W. Donovan

By John A. Bommhardt
Attorney

July 6, 1926.

J. W. DONOVAN 1,591,518

LAWN MOWER

Filed August 14, 1925     2 Sheets-Sheet 2

Inventor
John W. Donovan
By John A. Bommhardt
Attorney

Patented July 6, 1926.

1,591,518

UNITED STATES PATENT OFFICE.

JOHN W. DONOVAN, OF CLEVELAND, OHIO.

LAWN MOWER.

Application filed August 14, 1925. Serial No. 50,221.

This invention relates to improvements in lawn mowers, the primary object being to provide a structure wherein the rotary cutting member is driven by means of a motor or the like supported on the mower frame, independently of the ground wheels.

Another object is to provide a mower having a motor driven rotary cutter and to generally simplify the construction to facilitate adjustment of the parts and materially reduce the cost of manufacture.

Other objects will be apparent in the following descriptive matter.

In the accompanying drawings forming a part of this application:—

Figure 6 is a detail sectional view showing the removable bushing which permits of ready application of a driving belt or the like.

Similar characters of reference designate similar parts throughout the following specification and the accompanying drawings.

Figure 3:
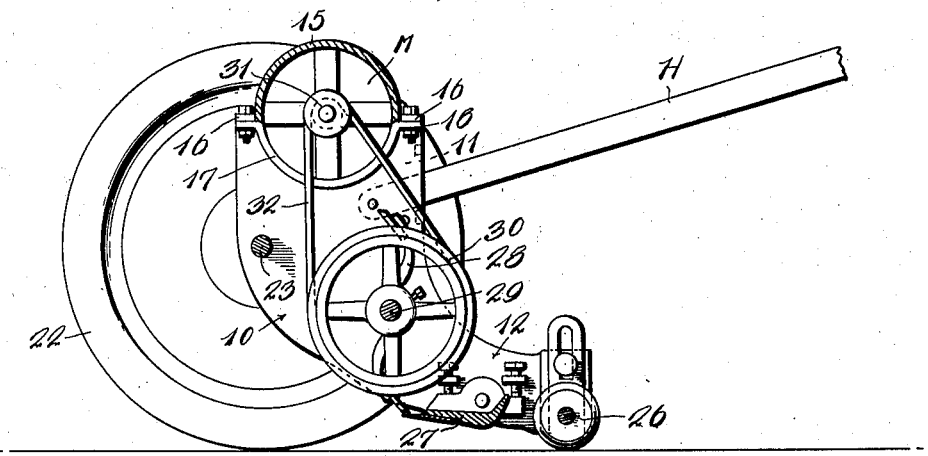
Figure 3 is a sectional view taken substantially on the line 3—3 of Figure 2.
Figure 4:
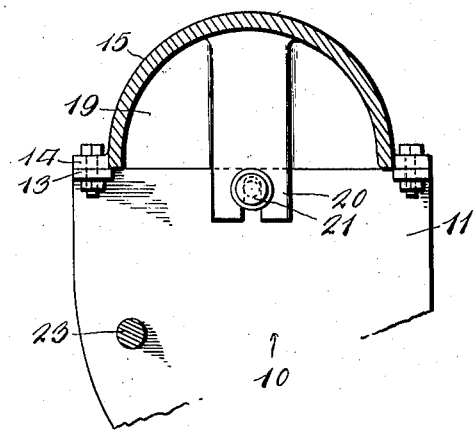
Figures 4 and 5 are sectional views detailing the structure of and connection between the arch member and the end supporting arms.
Figure 5:
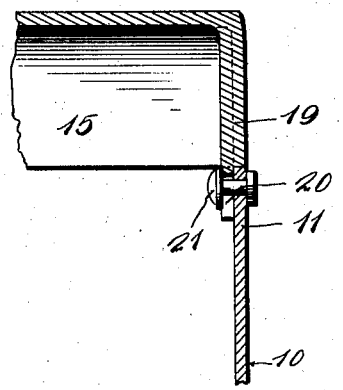

In the preferred form herein illustrated I employ a pair of end frame members or supporting arms 10 as shown in Figure 3 including relatively wide upper ends 11 and downwardly and rearwardly curved elbow portions 12 which as illustrated are somewhat narrower than the remaining portions. The upper ends 11 of these arms 10 are provided with apertured lugs 13 which are alineable with similarly formed lugs 14 carried by an arch member 15 serving to rigidly interconnect the end supporting arms 10 and to partially house an electric motor or the like M. This arch member 15 is substantially inverted U-shape in cross-section and is provided with radial flanges 16 at the point of mounting the motor M. A substantially U-shaped bracket 17 engages the lower side of the motor M and is provided with flanges 18 which are bolted to the aforementioned flanges 16 to assure rigid connection between the arch member 15 and the end supporting arms 10. I cast integrally with the end portions 19 of the arch member 15 a depending slotted finger 20 whose lower ends snugly engage the inner faces of the end supporting members or arms 10. Bolts 21 are carried by the end supporting arms 10 and separably connect the fingers 20 with said end members 10. This structure is clearly shown in Figures 4 and 5.

Figure 1:
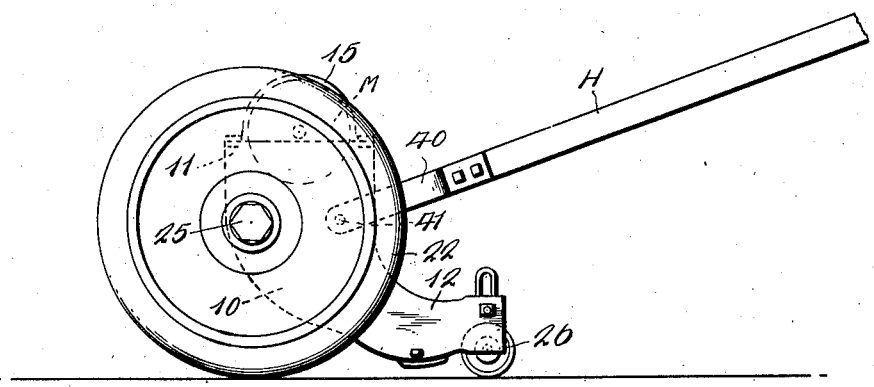
Figure 1 is a side elevation of the mower.
Figure 2:
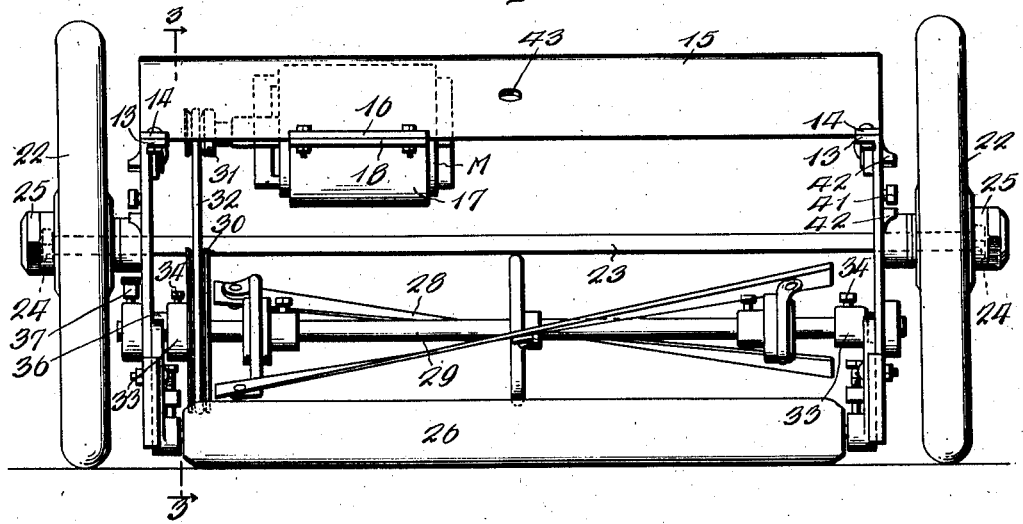
Figure 2 is an elevation with the handle removed.

This entire frame is supported on ground wheels 22 which are inter-connected by means of a shaft 23 as shown in Figure 2. The shaft has nuts 24 threaded on its ends and protected by means of cap members 25 in the ordinary manner.

The elbow portions 12 of the end supported arms 10 are connected by means of an ordinary ground engaging roller 26 which is vertically adjustable for obvious reasons. Arranged immediately in advance of this ground roller is a cutter bar 27 whose angle may be varied as desired. A rotary cutter 28 is fixed to a transverse shaft 29 and co-acts with the stationary cutter bar 27 as is understood. Actuation of this rotary cutter 28 is effected through fixing to one end of the shaft 29 a grooved sheave or pulley 30 which is vertically alined with a relatively small sheave or pulley 31 over which is trained a belt preferably though not necessarily formed of rubber. With this structure it is clear that operation of the motor M will transmit a rotary movement to the cutter 28. For the purpose of properly spacing the cutter 28 from the end supporting arms 10 I arrange adjacent the inner faces of these arms, and upon the shaft 29, adjustable collars 33 which are fixed to the shaft by means of set screws or the like 34. Bushings formed of brass or other preferred material are arranged in the flanged openings 35 through which the extremities of the shaft 29 extend.

Figure 6:
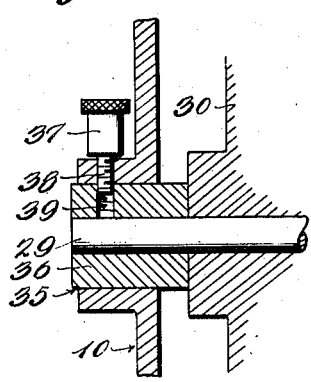

In Figure 6 I illustrate a structure which permits application of the endless drive belt 32 to the sheaves without extensive knocking down of the structure. This consists in providing a bushing 36 of unusual diameter and retaining the same in the opening 35 by means of a threaded extension 38 on a grease cup 37. Obviously other means may be employed if preferable. This threaded extension 38 projects into a radial opening 39 formed in the bushing 36 and serves the dual purpose of lubricating the bearing and removably securing the bushing in position. In applying an endless belt to the machine, the grease cup 37 is removed and the bushing 36 is drawn out of the opening 35. Under these conditions a belt may be looped around the shaft 29 passed through the bushing opening and over the pulley 30 and then have its upper end carried over the small pulley 31 which is fixed to the motor shaft. The advantages of this structure are believed quite apparent.

A handle H is attached to the mower in substantially the usual manner, that is, a pair of metal brackets 40 is fixed to the handle H and then bent radially in opposite directions and then forwardly in parallel relation for pivotal connection to the end supporting members 10. In my structure the ends of the brackets 40 are pivoted to the bolts 41 and the vertical movement of the handle is limited through arranging pairs of lugs 42 as shown.

I am aware of certain patents on lawn mowers wherein the rotary cutter is driven independently of the ground wheels but the structures are quite complicated and unreliable whereas my mower is substantially built and designed for long life as well as comparatively inexpensive manufacture.

Further it is seen that the assembly of the parts in my mower is easily effected.

While I have not shown a source of current supply, it is to be understood that a long conductor may be attached to a storage battery or house lighting system and one end of the conductor would be carried through the opening 43 formed in the arch member 15 and then to the motor.

Certain minor changes in the details of construction may be resorted to, and such of these changes as fall within the scope of the appended claims, I consider within the spirit of my invention.

I claim:—

1. In a lawn mower, a pair of spaced end supporting arms having rearwardly extended narrowed lower portions and widened upper ends, an arch member substantially inverted U-shape in cross-section connecting the upper ends, and means for supporting a motor in one end portion of the arch member.

2. An improvement in motor driven lawn mowers comprising, an axle, a pair of supporting wheels on the axle, a cutter bar, a ground roller, and a rotary cutter; said improvement consisting in providing a main frame comprising end arms having enlarged upper ends extending above the axle, an arch member substantially inverted U-shape in cross-section connecting said enlarged ends, and a cutter driving motor supported and partially housed by the arch member.

In testimony whereof, I affix my signature.

JOHN W. DONOVAN.